United States Patent
Bliton et al.

(10) Patent No.: US 8,607,929 B2
(45) Date of Patent: *Dec. 17, 2013

(54) ACOUSTICALLY TUNABLE SOUND ABSORPTION ARTICLES AND METHODS OF MAKING SAME

(71) Applicant: Precision Fabrics Group, Inc., Greensboro, NC (US)

(72) Inventors: Richard James Bliton, Greensboro, NC (US); Samuel Mark Gillette, Burlington, NC (US); Troy Raymond Buechler, Salisbury, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,706

(22) Filed: Mar. 8, 2013

(65) Prior Publication Data

US 2013/0186706 A1 Jul. 25, 2013

Related U.S. Application Data

(63) Continuation of application No. 12/965,357, filed on Dec. 10, 2010, now Pat. No. 8,403,108, which is a continuation-in-part of application No. 12/814,022, filed on Jun. 11, 2010, now Pat. No. 8,439,161.

(60) Provisional application No. 61/186,509, filed on Jun. 12, 2009.

(51) Int. Cl.
*E04B 1/84* (2006.01)
*E04B 1/82* (2006.01)
*G10K 11/16* (2006.01)
*E04B 1/74* (2006.01)
*G10K 11/00* (2006.01)

(52) U.S. Cl.
USPC ........... 181/294; 181/286; 181/296; 296/39.3

(58) Field of Classification Search
USPC ......... 181/294, 286, 296, 284, 290, 291, 204; 296/39.3
See application file for complete search history.

(56) References Cited

U.S. PATENT DOCUMENTS 2,893,105 A 7/1959 Lauterbach
4,097,633 A 6/1978 Focht
(Continued)

FOREIGN PATENT DOCUMENTS

EP 0373135 B1 4/1996
WO WO 93/18218 A1 9/1993
(Continued)

OTHER PUBLICATIONS

Wyerman et al., "Optimization of Sound Absorbers Using Resistive Facings," 09NVC-341, 2009 SAE International.
(Continued)

*Primary Examiner* — Edgardo San Martin
(74) *Attorney, Agent, or Firm* — Myers Bigel Sibley & Sajovec, P.A.

(57) ABSTRACT

A moldable acoustic facing comprises cellulosic fibers and synthetic fibers entangled together. The acoustic facing has a basis weight of from about 1.5 to about 5.0 ounces per square yard (osy), a thickness of less than about 0.050", a mean pore size of between about 8 microns and about 40 microns, and an elongation at break of at least twenty percent. The acoustic facing includes less than about five percent synthetic microfiber and has an acoustic resistance of at least about 250 Rayls.

55 Claims, 6 Drawing Sheets

(56) References Cited

U.S. PATENT DOCUMENTS

| | | |
|---|---|---|
| 4,283,457 A | 8/1981 | Kolsky et al. |
| 4,726,987 A | 2/1988 | Trask et al. |
| 5,186,996 A | 2/1993 | Alts |
| 5,298,694 A | 3/1994 | Thompson et al. |
| 5,418,031 A | 5/1995 | English |
| 5,446,100 A | 8/1995 | Durrance et al. |
| 5,459,291 A | 10/1995 | Haines et al. |
| 5,554,238 A | 9/1996 | English |
| 5,582,906 A | 12/1996 | Romesberg et al. |
| 5,804,262 A | 9/1998 | Stevens et al. |
| 5,886,306 A | 3/1999 | Patel et al. |
| RE36,323 E | 10/1999 | Thompson et al. |
| 6,124,222 A | 9/2000 | Gebreselassie et al. |
| 6,145,617 A | 11/2000 | Alts |
| 6,214,456 B1 | 4/2001 | Boyd et al. |
| 6,220,388 B1 | 4/2001 | Sanbora |
| 6,443,257 B1 | 9/2002 | Wiker et al. ............... 181/290 |
| 6,534,145 B1 | 3/2003 | Boyles ......................... 428/92 |
| 6,631,785 B2 | 10/2003 | Khambete et al. |
| 6,648,100 B2 | 11/2003 | Ebbitt |
| 6,720,068 B1 | 4/2004 | Vanbemmel et al. |
| 6,893,711 B2 | 5/2005 | Williamson et al. |
| 7,137,477 B2 | 11/2006 | Keller et al. |
| 7,195,814 B2 | 3/2007 | Ista et al. ................... 428/292.1 |
| 7,310,739 B2 | 12/2007 | Wu et al. |
| 7,320,739 B2 | 1/2008 | Thompson, Jr. et al. |
| 7,329,457 B2 | 2/2008 | Renard et al. ............. 428/297.4 |
| 7,410,030 B2 | 8/2008 | Fusiki et al. |
| 7,837,009 B2 | 11/2010 | Gross et al. |
| 7,878,301 B2 | 2/2011 | Gross et al. |
| 7,918,313 B2 | 4/2011 | Gross et al. |
| 8,230,969 B2 | 7/2012 | Frederick et al. ............ 181/293 |
| 2002/0025421 A1 | 2/2002 | Sugawara et al. |
| 2004/0077247 A1 | 4/2004 | Schmidt et al. |
| 2004/0131836 A1 | 7/2004 | Thompson |
| 2004/0134048 A1 | 7/2004 | Hartgrove et al. |
| 2006/0065482 A1 | 3/2006 | Schmidft et al. |
| 2006/0090958 A1 | 5/2006 | Coates et al. |
| 2006/0137799 A1 | 6/2006 | Haque et al. |
| 2006/0237130 A1 | 10/2006 | Thompson |
| 2007/0151800 A1 | 7/2007 | Olson et al. |
| 2008/0121461 A1 | 5/2008 | Gross et al. |
| 2010/0066121 A1 | 3/2010 | Gross ........................ 296/146.5 |
| 2010/0112881 A1 | 5/2010 | Bahukudumbi |
| 2010/0147621 A1 | 6/2010 | Gillette ........................ 181/294 |
| 2010/0314195 A1 | 12/2010 | Bliton et al. ................. 181/290 |
| 2011/0114414 A1 | 5/2011 | Bliton et al. |
| 2011/0256791 A1 | 10/2011 | Seidel et al. |
| 2011/0284319 A1 | 11/2011 | Frederick et al. |

FOREIGN PATENT DOCUMENTS

| | | |
|---|---|---|
| WO | WO 98/13540 A1 | 4/1998 |
| WO | WO 2006/107847 A1 | 10/2006 |
| WO | WO 2008/062289 A2 | 5/2008 |
| WO | WO 2010/038486 A1 | 4/2010 |

OTHER PUBLICATIONS

Notification of Transmittal of the International Search Report and the Written Opinion of the International Searching Authority, or the Declaration corresponding to PCT/US2010/059844 mailed Mar. 28, 2011.

Notification of Transmittal of the International Search Report and the Written Opinion of the International Searching Authority, or the Declaration corresponding to PCT/US2010/038311 mailed May 25, 2011.

Notification Concerning Transmittal of International Preliminary Report on Patentability corresponding to PCT/US2010/038311 mailed Dec. 22, 2011.

CHARACTERIZATION OF ACOUSTIC MATERIALS

| MATERIAL | MICROFIBER | BASIS Wt. (osy) | THICKNESS (0.000") ASTM D1777 | DENSITY | AIR PERM (cfm) FRAZIER AIR PERM. @ 0.5"WC | AIR PERM (RAYLS) | MEAN FLOW PORE Dia. (MICRONS) |
|---|---|---|---|---|---|---|---|
| RESIN BOND 50 gsm | NO | 1.73 | 0.016 | 9.01 | 518 | 40 | 57.84 |
| RESIN BOND 80 gsm | NO | 2.68 | 0.026 | 8.59 | 423 | 49 | 55.74 |
| 8851 | NO | 2.09 | 0.012 | 14.49 | 52 | 428 | 18.09 |
| S/8705 | NO | 2.13 | 0.013 | 13.63 | 66 | 332 | 23.81 |
| 6300-50003 | NO | 2.53 | 0.020 | 10.71 | 210 | 101 | 37.19 |
| 6300-51003 | NO | 2.60 | 0.011 | 20.29 | 79 | 277 | 24.98 |
| 6186-50030 | NO | 2.25 | 0.015 | 12.21 | 62 | 357 | 19.70 |
| 6186-51030 | NO | 2.31 | 0.010 | 18.60 | 28 | 818 | 12.94 |
| 6079-50001 | NO | 2.74 | 0.014 | 16.33 | 22 | 1037 | 12.74 |
| INDUSTRY-INCUMBENT | NO | 3.10 | 0.021 | 12.31 | 311 | 68 | 51.19 |
| RESIN BOND 267 | NO | 1.34 | 0.011 | 10.18 | 575 | 36 | 60.65 |
| RESIN BOND 4016 | NO | 0.94 | 0.009 | 8.73 | 642 | 32 | 57.97 |
| RESIN BOND 557 | NO | 1.18 | 0.010 | 9.81 | 536 | 39 | 54.88 |
| RESIN BOND 477 | NO | 1.47 | 0.012 | 10.19 | 403 | 52 | 51.10 |
| RESIN BOND 497 | NO | 1.94 | 0.014 | 11.55 | 288 | 73 | 43.97 |
| SPLITTABLE 060 | YES | 1.78 | 0.0097 | 15.29 | 121 | 179 | 33.00 |
| SPLITTABLE 100 | YES | 2.92 | 0.0143 | 17.03 | 22 | 1014 | 11.06 |
| SPLITTABLE 130 | YES | 3.98 | 0.016 | 20.71 | 21 | 1088 | 6.39 |
| SPLITTABLE 170 | YES | 5.18 | 0.028 | 15.42 | 8 | 2858 | 7.09 |
| 80080 | YES | 1.52 | 0.0137 | 9.25 | 21 | 1107 | 6.64 |
| 6244-54000 | YES | 2.01 | 0.016 | 10.26 | 17 | 1370 | 6.03 |

*FIG. 4*

ACOUSTICALLY TUNABLE SOUND ABSORPTION ARTICLES AND METHODS OF MAKING SAME

RELATED APPLICATIONS

This application claims priority under 35 U.S.C. §120 to, and is a continuation of, U.S. patent application Ser. No. 12/965,357, filed Dec. 10, 2010, which claims priority under 35 U.S.C. §120 to, and is a continuation-in-part of, U.S. patent application Ser. No. 12/814,022, filed Jun. 11, 2010, which itself claims priority under 35 U.S.C. §119(e) to U.S. Provisional Patent Application No. 61/186,509, filed Jun. 12, 2009, the disclosure of each of which is incorporated herein by reference in its entirety.

FIELD OF THE INVENTION

The present invention relates to a sound absorption material, and particularly to the use of sound absorption materials in acoustic applications such as vehicles, appliances, and buildings.

BACKGROUND

Noise reduction in a wide variety of environments such as buildings, vehicles, i.e., equipment, etc., is generally considered as desirable. For example, in vehicles such as automobiles it is highly desirable to reduce the external noises, namely road noise, wind noise, engine noise, vibrations as well as internal noises through the use of various acoustic materials.

Often, acoustic engineers attempt to achieve sound attenuation by the use of various acoustic materials. For example, so-called scrim layers are often used over thick low density spacer materials and voids located in floor panels, headliners and door panels of a vehicle. One example is the use of perforated films as described in U.S. Pat. No. 4,097,633. It is believed, however, that various production and quality issues are problematic in this approach. Microfiber scrims have also been proposed and used in a multilayer acoustically tuned sound absorbing composite such as described in U.S. Pat. No. 6,631,785. Other examples of various scrim layers include U.S. Pat. Nos. 5,186,996; 5,298,694; 5,886,306; 6,145,617; 7,310,739; and U.S. Patent Application Publication No. 2007/051800.

However, there continues to be a need for acoustic materials having improved sound absorbing properties, wherein such materials are low in thickness, low in weight, low in cost, and provide the necessary safety and sound absorption properties.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In view of the above discussion, an acoustically tunable sound absorption facing is provided. The acoustically tunable sound absorption facing, comprises cellulosic fibers entangled together, for example, via spunlacing. Such a sound absorption facing has controllable air flow resistance. The air flow resistance translates into acoustic performance measured in Rayls. A Rayl is one of two units of acoustic impedance. When sound waves pass through any physical substance the pressure of the waves causes the particles of the substance to move. The sound impedance is the ratio between the sound pressure and the particle velocity it produces. The impedance is one Rayl if unit pressure produces unit velocity. In MKS units, 1 Rayl equals 1 pascal-second per meter (Pa·s·m-1), or equivalently 1 newton-second per cubic meter (N·s·m-3). In SI base units, that's kg·s-1·m-2. In CGS units, 1 Rayl equals 1 dyne-second per cubic centimeter (dyn·s·cm-3).

1 CGS rayl=10 MKS Rayls.

The air flow resistance and, thus, the acoustic performance of the facing is controlled, or "tuned" by adjusting the facing construction, with regards to basis weight, cellulosic facing-to-nonwoven web ratio, and by the action of chemical and mechanical processing. Chemical finishing may include application of binder or filled binder coatings to fill in and reduce the permeability of the facing. Mechanical processing may include stretching, drawing, and/or overfeeding of the facing during the chemical finishing process, or calendaring the facing fabric after finishing to adjust the permeability. A facing, according to embodiments of the present invention, may be acoustically tuned to have air flow resistance in the range of about 245 rayls to about 2450 rayls. More preferably a facing may be tuned to have air flow resistance from about 400 rayls to about 1650 rayls, and more preferably, the facing may be tuned to have air flow resistance from about 800 rayls to about 1200 rayls.

According to some embodiments of the present invention, an acoustically tunable sound absorption facing having controllable air flow resistance comprises cellulosic fibers and a nonwoven fiber batt entangled together. The cellulosic fibers comprise between about 20 to 100 percent by weight of the sound absorption facing and the nonwoven batt comprises about 0 to 80 percent by weight of the facing. In some embodiments, the cellulosic fibers are in the form of a web or sheet. In some embodiments, the sound absorption facing has a basis weight of at least about 0.7 osy. In some embodiments, the sound absorption facing includes a flame retardant.

An acoustically tunable sound absorption facing, according to embodiments of the present invention, can be used in combination with one or more other layers or substrates to provide a sound attenuating laminate. Such a laminate can be used in a wide variety of environments including, but not limited to, vehicles. Additionally, a facing may be treated with finishes or coatings to impart color, flame resistance, resistance to oils and greases, water repellency, anti-mold and mildew, corrosion resistance, and antimicrobial properties.

An acoustically tunable sound absorption facing, according to embodiments of the present invention, may also be coated, printed, sintered, sprayed, or otherwise treated with an adhesive layer to enable bonding and molding of subsequent parts. These bonded and molded panels are typically comprised of a sound absorption facing, according to embodiments of the present invention, and a bulky, low density sound absorbing insulating panel.

Additionally, an acoustically tunable sound absorption facing, according to embodiments of the present invention, may be treated or fashioned in such a way to allow high levels of stretch when molded. This may be done by the incorporation of soft or elastomeric binders, soft or elastomeric fibers or a combination of such.

An acoustically tunable sound absorption facing, according to some embodiments of the present invention, can be used in combination with one or more other layers or substrates to provide a sound attenuating laminate. This laminate comprises a layer of the surface facing fabric of the invention laminated to a thick low density material, comprised of materials such as fiberglass batting, resinated fiberglass panels, rock wool, plastic foam, urethane foam, shoddy pad from waste fiber, polyester batting or resinated fiberfill, aerogel, closed cell foam, reticulated foam and other insulation materials known to the art. The addition of the facing fabric significantly improves the sound attenuation properties of the base absorber material, allowing for improved performance, and reduced weight. The facing fabric may also be positioned on the top and bottom of the low density insulator to form a sandwich-type trilaminate.

Such a laminate can be used in a wide variety of environments including vehicles, appliances, buildings, homes, and office furniture (i.e. office partitions), aircraft, commercial buildings, trains and motor coaches, theaters, audio studios, home audio or theater rooms, sound insulation for noisy equipment and machines, or other applications where sound attenuation is desired.

According to some embodiments of the present invention, a moldable acoustic facing comprises cellulosic fibers (e.g., wood pulp, etc.) and synthetic fibers entangled together. The acoustic facing has a basis weight of from about 1.5 to about 5.0 ounces per square yard (osy), a thickness of less than about 0.050" as measured via ASTM D1777, a mean pore size of between about 8 microns and about 40 microns, and an elongation at break of at least twenty percent (20%) as measured via ASTM D5034. The acoustic facing comprises less than about five percent (5%) synthetic microfiber and has an acoustic resistance of at least about 250 Rayls. In some embodiments of the present invention, the cellulosic fibers comprise between about 20 to about 100 percent by weight of the acoustic facing and the nonwoven fibers comprises between about 0 to about 80 percent by weight of the acoustic facing. In some embodiments of the present invention, the cellulosic fibers are in the form of a web or paper sheet and the web or paper sheet is entangled with the nonwoven fibers. The synthetic fibers may include fibers selected from the group consisting of polypropylene, polyethylene, polyethylene terephthalate, polyester, acetate, nylon, polylactic acid (PLA), glass, viscose, tencel, rayon, and acrylic fibers, and blends thereof. Additional modification of the air flow resistance of the acoustic facing may be provided by mechanical processes (e.g., stretching, bulking, and/or calendaring) and/or chemical treatment processes (e.g., finishing, coating, and/or adhesive application).

In some embodiments of the present invention, the acoustic facing is attached to at least one additional layer to form a laminate. Exemplary additional layers include, but are not limited to, fiberglass batting, a resinated fiberglass panel, rock wool, plastic foam, urethane foam, shoddy pad from waste fiber, polyester batting or resinated fiberfill, aerogel, closed cell foam, or reticulated foam. In addition, a decorative fabric layer may also be attached to the acoustic facing.

According to some embodiments of the present invention, a moldable acoustic facing has a basis weight of from about 1.5 to about 5.0 ounces per square yard (osy), a thickness of less than about 0.050" as measured via ASTM D1777, a mean pore size of between about 8 microns and about 40 microns, and an elongation at break of at least twenty percent (20%) as measured via ASTM D5034. The acoustic facing comprises less than about five percent (5%) synthetic microfiber and has an acoustic resistance of at least about 250 Rayls. In some embodiments, the acoustic facing comprises nonwoven fabric that may include cellulosic fibers, such as wood pulp. The cellulosic fibers may comprise between about 20 to about 100 percent by weight of the acoustic facing and synthetic fibers may comprise between about 0 to about 80 percent by weight of the acoustic facing. In some embodiments of the present invention, the cellulosic fibers are in the form of a web or paper sheet and the web or paper sheet is entangled with the nonwoven fibers. The synthetic fibers may include fibers selected from the group consisting of polypropylene, polyethylene, polyethylene terephthalate, polyester, acetate, nylon, polylactic acid (PLA), glass, viscose, tencel, rayon, and acrylic fibers, and blends thereof. Additional modification of the air flow resistance of the acoustic facing may be provided by mechanical processes (e.g., stretching, bulking, and/or calendaring) and/or chemical treatment processes (e.g., finishing, coating, and/or adhesive application).

In some embodiments of the present invention, the acoustic facing is attached to at least one additional layer to form a laminate. Exemplary additional layers include, but are not limited to, fiberglass batting, a resinated fiberglass panel, rock wool, plastic foam, urethane foam, shoddy pad from waste fiber, polyester batting or resinated fiberfill, aerogel, closed cell foam, or reticulated foam. In addition, a decorative fabric layer may also be attached to the acoustic facing.

According to other embodiments of the present invention, a sound absorption laminate includes first and second acoustic facings, and a low density layer of material sandwiched between the first and second acoustic facings. Each facing is a moldable fabric having a basis weight of from about 1.5 to 5.0 ounces per square yard (osy), a thickness of less than about 0.050" as measured via ASTM D1777, a mean pore size of between about 8 microns and about 40 microns, and an elongation at break of at least twenty percent (20%) as measured via ASTM D5034. The fabric of each facing includes less than about five percent (5%) synthetic microfiber and has an acoustic resistance of at least about 250 Rayls. The low density layer of material may include a fiberglass batting, a resinated fiberglass panel, rock wool, plastic foam, urethane foam, shoddy pad from waste fiber, polyester batting or resinated fiberfill, aerogel, closed cell foam, or reticulated foam.

According to other embodiments of the present invention, a sound absorption article includes a facing having a finish coating for providing one or more additional functional properties (e.g., flame retardancy, adhesive properties, crock resistance, grab tensile, tear strength, color, microbial resistance, electrical conductivity, thermal conductivity, opacity, controllable modulus, water repellency, corrosion resistance, and controllable surface texture) to the facing, and a low density layer of material laminated to the facing. The facing is a moldable fabric having a basis weight of from about 1.5 to 5.0 ounces per square yard (osy), a thickness of less than about 0.050" as measured via ASTM D1777, a mean pore size of between about 8 microns and about 40 microns, and an elongation at break of at least twenty percent (20%) as measured via ASTM D5034. The fabric comprises less than about five percent (5%) synthetic microfiber and has an acoustic resistance of at least about 250 Rayls;

According to other embodiments of the present invention, a method of making an acoustically tuned facing includes preparing a moldable acoustic fabric and tuning the fabric to have an acoustic resistance of at least about 250 Rayls by applying a chemical finish to the fabric and/or subjecting the fabric to one or more mechanical processes (e.g., stretching, bulking, calendaring, or a combination thereof). The moldable acoustic fabric has a basis weight of from about 1.5 to 5.0 ounces per square yard (osy), a thickness of less than about 0.050" as measured via ASTM D1777, a mean pore size of between about 8 microns and about 40 microns, and an elongation at break of at least twenty percent (20%) as measured via ASTM D5034. Furthermore, the moldable acoustic fabric comprises less than about five percent (5%) synthetic microfiber.

In some embodiments, the method further includes laminating at least one additional layer to the fabric. Exemplary additional layers include, but are not limited to, fiberglass batting, a resinated fiberglass panel, rock wool, plastic foam, urethane foam, shoddy pad from waste fiber, polyester batting or resinated fiberfill, aerogel, closed cell foam, or reticulated foam. In addition, the at least one additional layer may be a decorative fabric layer.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIG. 4 is a table of properties of various facings, according to some embodiments of the present invention.

DETAILED DESCRIPTION

Figure 1:
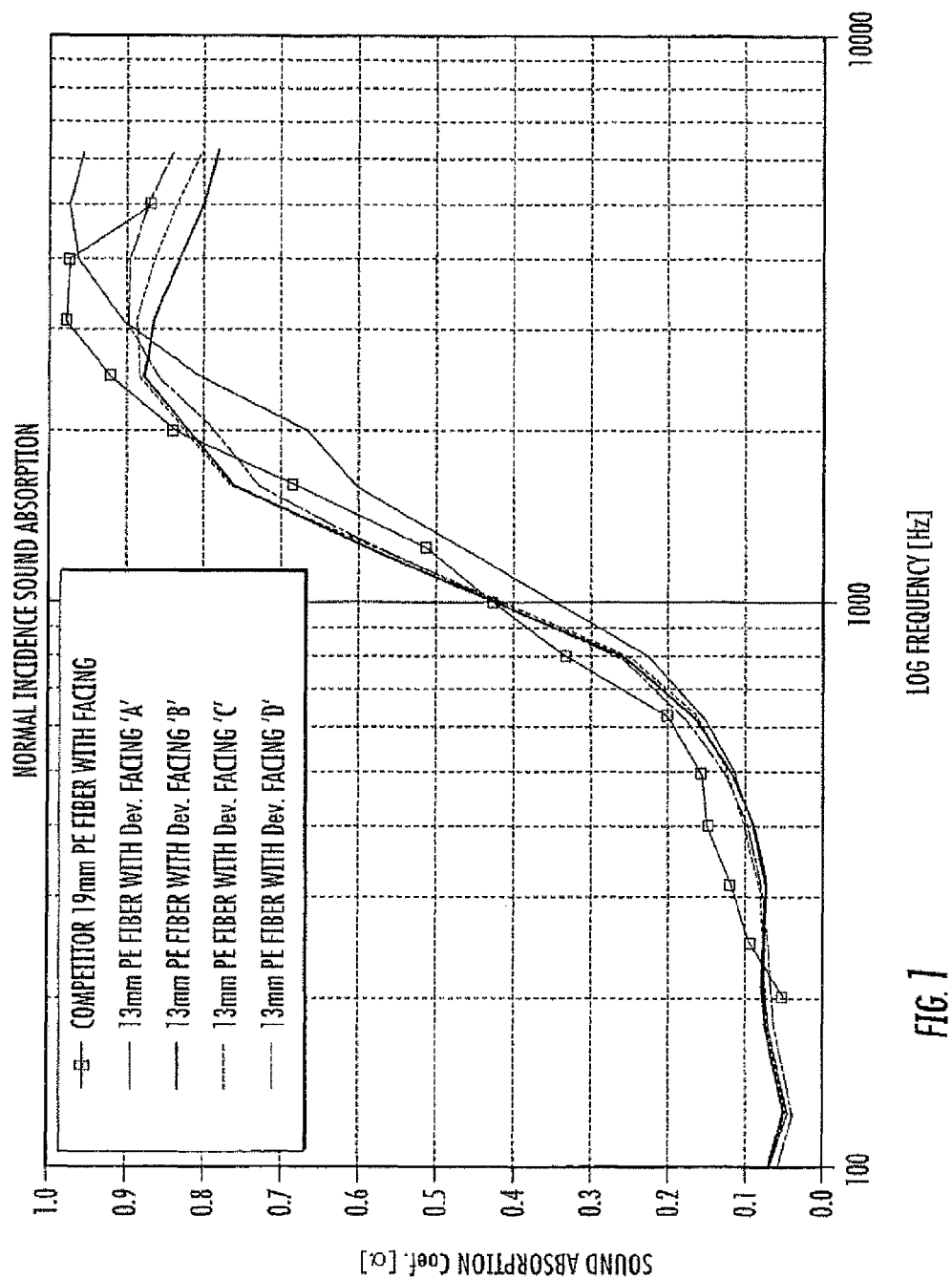
FIG. 1 is the measured influence of various developmental facings measured in the impedance tube.

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps; operations, elements, components, and/or groups thereof. As used herein, the term "and/or" includes any and all combinations of one or more of the associated listed items and may be abbreviated as "/".

The terms "facing," "facing layer," and "facing fabric" are interchangeable as used herein and are defined as a layer of material that can be attached to a surface of another object or material. A facing layer can be attached to a surface of another object or material in various ways including, but not limited to, adhesive bonding, thermal bonding, point bonding, pressure bonding, extrusion coating, or ultrasonic bonding.

The term "laminate" as used herein refers to a composite structure of two or more material layers that have been adhered through a bonding step, such as through adhesive bonding, thermal bonding, point bonding, pressure bonding, extrusion coating, or ultrasonic bonding.

The term "machine direction" or MD refers to the direction along the length of a fabric in the direction in which it is produced.

The terms "cross machine direction," "cross directional," or CD mean the direction across the width of fabric, i.e. a direction generally perpendicular to the MD.

The terms "nonwoven" and "nonwoven web" refer to materials and webs of material having a structure of individual fibers or filaments which are interlaid, but not in an identifiable manner as in a knitted fabric. The terms "fiber" and "filament" are used herein interchangeably. Nonwoven fabrics or webs may be formed from many processes including, but not limited to, meltblowing, spunbonding, air laying processes, etc.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

In some embodiments, an acoustically tunable sound absorption facing is provided by a cellulosic web or sheet and a nonwoven web entangled together. The cellulosic web or sheet consists of a wet-laid or paper like sheet of cellulosic fiber. While wood fiber is preferred, other types of cellulosic fiber that can be wet-laid into a paper sheet could be used as the precursor cellulosic web. Additionally, minor amounts, not to exceed 49% of the cellulosic web could be comprised of synthetic fibers. Useful cellulosic fibers include wood fibers (pulp) such as bleached Kraft, softwood or hardwood, high-yield wood fibers, cotton, viscose, and other fibers suitable for making into a paper sheet. Other natural fibers include bagesse, milkweed, wheat straw, kenaf, jute, hemp, bamboo, cotton, and these natural fibers may be blended with the cellulosic fibers. Synthetic fibers that are prepared in very short fiber length may be formed into a wet-laid paper sheet. These fibers may be polyester, nylon, olefin, cellulose acetate, silk, wool, and other fibers known to the art. A preferred selection of wood fibers that provide the desired air flow resistance in the final cellulosic sheet may be employed for this facing; are red cedar and spruce pulps.

The nonwoven web portion may contain randomly oriented fibers or substantially aligned fibers. Exemplary fibers include, but are not limited to, polypropylene, polyethylene, polyethylene terephthalate, polyester, acetate, nylon, polylactic acid (PLA), glass, viscose and acrylic fibers, and blends thereof. Alternatively, performance fibers such as Nomex or Kevlar (DuPont), Kermel (Rhone Poulenc), polybenzirnidazole (PBI—Hoechst), Basofil (BASF), polyetheretherketone (PEEK—Zyex Ltd.), Visil (Kuitu Finland Oy), Intern, Lexan or Valox (GE Plastics) fibers may be used. The staple fiber batt may be made using 1.5 denier 1.5 inch long polyester drawn and crimped fibers which are known to spunlace well. However, other length and denier fibers including microfiber and splittable staple fibers may also be used for the nonwoven portion of the sound absorption facing.

The basis weight for the facing fabric before finishing is from about 0.7 to about 5.0 ounces per square yard (osy). Typically, the facing comprises 20-100 percent by weight cellulosic fibers by weight and 0-80 percent by weight other fibers.

As mentioned above, after the sound absorption facing has been formed and dried, it may be used without additional processing. If the initial air flow resistance of a given fabric is not in the desired range, the sound absorption facing can be further modified by finishing and/or calendaring. Stretching, bulking, drawing, drying and curing of the facing are additional steps that generally occur during the finishing or coating process. These processes are to modify and adjust the permeability and sound attenuating properties of the sound absorption facing so as to tune the sound attenuation properties. Additionally, the use of the scrim fabric of the invention on the face of a bulky and heavy sound absorber panel, allows reduction in the weight and bulk, without a loss of performance.

Acceptable levels of stretch of acoustic facings, according to embodiments of the present invention are shown in Table 1 below. The data in Table 1 was obtained in accordance with ASTM D5034.

TABLE 1

Acoustic Facing -

| Style # | MD Elongation (%) | CD Elongation (%) | MD Modulus at 10% | Description |
|---|---|---|---|---|
| Industry Incumbent | 17.3 | 33.7 | 11.4 | 1.7 osy facing (non PFG) |
| 6075-50001 | 22.4 | 48.4 | 22.4 | 08851 stretched 155-180" |
| 6075-51001 | 24.5 | 53.23 | 18.67 | 6075-50001 calendared |
| 6075-50003 | 23.7 | 88.3 | 27.7 | 08851 necked down 155-144" (450 F.) |
| 6075-50006 | 23 | 86.1 | 27 | 8851 necked down 155-144" (300 F.) |
| 6075-54006 | 22.1 | 79.4 | 30.1 | 6075-50006 coated with reactive adhesive |
| 6186-50011 | 35.4 | 61.5 | 8.6 | 08851 stretched 155-177" |
| 6186-52010 | 33.4 | 56.9 | 12.7 | 6186-50011 coated with PET adh on Line 8 |
| 6186-50012 | 36.4 | 56.7 | 7.5 | 08851 stretched 155-180" |
| 6186-50020 | 29.5 | 96 | 15.7 | 0881 necked down 155-146" |
| 6300-50003 | 28.1 | 138.1 | 19.3 | 00697 finished on Frame #1 (no stretch) |
| 6300-51003 | 28.7 | 157.53 | 13.43 | 6300-50003 calendared (CAL # - 250 F.) |
| 6300-52103 | 25 | 135.6 | 23.3 | 6300-51003 coated with PET adh on Line 8 |
| Min | 17.3 | 33.7 | 7.5 | |
| Max | 36.4 | 157.53 | 30.1 | |

As indicated above in Table 1, an elongation at break of at least 17% is necessary for an acoustic facing to be moldable, according to embodiments of the present invention.

The chemical finishing of the facing comprises application of chemistry that will form film structure or fill in the structure of the facing thereby reducing the air permeability, and increasing the sound attenuation properties of the product. Emulsion and solution binders, adhesives, polymer dispersions, and thickeners may be used to reduce the permeability of the sheet. Additionally, the binder solutions may have added filler materials such as clay, talc, glass beads, ceramic beads and particles, graphite, calcium carbonate, barium sulfate, vermiculite, hydrated alumina, titanium dioxide, expandable fillers, expandable microspheres, swellable fillers, and other particulate filler materials to assist in decreasing the permeability of the sheet. Auxiliary chemicals such as corrosion inhibitors, flame retardants, oil and water repellents, pigments and colors, antimicrobial agents, and adhesive promoters may be added to enhance the properties of the sheet for a particular end use. For example, an acoustic panel for use in an automobile engine compartment would need to be both flame retardant and oil resistant.

Other types of finishing application equipment may be used to accomplish the addition of the chemical finish to the facing, including printing, paste coating, kiss coating, spray, roller coating, gravure, slot coating, and other application methods known to the art.

Various flame retardants may also be useful for finishing the sound absorption facing in order to impart flame retardant properties, low smoke generation and heat resistant properties and to increase the density or modify the air flow resistance of the facing. Flame retardants which are useful for this invention include durable, semi-durable and nondurable flame retardants, organic and inorganic flame retardants and combinations thereof. Furthermore, functional fillers such as alumina trihydrate, ammonium polyphosphate, compounds containing alkali and alkaline earth metals, borates, ammonium salts, nitrogen containing compounds, phosphates, phosphonates, halogens and sulfamates are useful for finishing and coating the facing. Other types of flame retardants which are of utility in this application include intumescent systems, vapor phase flame retardants and systems, endothermic flame retardants and combinations thereof. The list of possible flame retardants for this application is vast and will be obvious to those skilled in the art of finishing and coating fabrics.

Any water based emulsion or dispersion commonly known as a binder or latex may also be used to modify the air flow resistance of the sound absorption facing and to impart additional functional properties to the facing. Acrylic binders, vinyl acrylic binders, vinyl acetate binders, styrene containing binders, butyl containing binders, starch binders, polyurethane binders, and polyvinylalcohol containing binders are examples of binders that find utility in coating and finishing the facing. The binders may be film forming so as to reduce the air flow resistance of the sound absorption facing. The binders may also be loaded with a filler so as to reduce the air flow resistance of the sound absorption facing. Also, the binders may be salt tolerant so that they can be used in conjunction with ionic flame retardants. The use of thermoplastic binders can provide adhesive properties to the sound absorption facing if the binder is on the surface of the facing and the facing is subsequently reheated to bond to another surface. Binders may also be thermoset to limit the degree of crushing during the calendaring process, thereby allowing for a controllable and small reduction in air flow resistance. On the other hand, thermoplastic binders may be utilized to cause a large reduction in air flow resistance during the calendaring process. Other properties that the binder may impart include, but are not limited to, improved crock resistance, increased grab tensile and greater tear strength. Selected binders may be applied to the sound absorption facing to modify its stiffness and flexibility and to cause the facing to retain its shape if it is post molded or "B staged."

The concentration of binder in a pad finishing formulation is generally between 0 percent and 25 percent. When a foam finishing or coating process is utilized, binders may comprise between 0 percent and 100 percent of the finish formulation. In similar fashion flame retardants may comprise between 0 percent and 100 percent of a finishing formulation depending on application method and the properties that are being sought through finishing. Pigment dispersions, water repellents, waxes, lubricants, dyes, antimicrobials, defoamers, profoamers, corrosion inhibitors, antimicrobials, thickening agents, wetting agents, fillers, and other coating additives are useful in the present invention.

Additionally, the chemical modification of the scrim can be accomplished through solvent based, 100% solids based, powder application, hot melt application or other chemistry application methods known to the art.

The sound absorption facing may be used as a decorative layer, e.g., a fabric layer, or it may be covered with other layers to improve the aesthetic properties. In order to make bonding to high loft layers or decorative layers easier, it is possible to print or coat an adhesive pattern onto the facing which does not materially change the air flow resistance thereof. The adhesive can be applied as a hot melt using a pattern engraved in a gravure roll, powder coating, adhesive web, adhesive film or net, by screen printing or foam coating a pattern of compounded powdered adhesive or adhesive onto the facing, or by spraying adhesive onto the facing. The adhesive is selected according to the temperature desired for thermally reactivating the adhesive, according to the material that will be mated with the sound absorption facing and according to other factors such as the open time of the adhesive, the temperature capabilities of the processing equipment, adhesive viscosity, melt-flow index, and the strength and esthetic qualities of the bond. The array of thermally reactivateable adhesives, application equipment, and application techniques is vast; however, someone trained in the art can quickly arrive at a suitable system for this application. The types of adhesives that have been used to good effect include thermoplastic and thermoset adhesives such as polyester based adhesives, polyamide, urethane, and olefinic adhesives. When thermoset adhesives are applied to the facing it is important not to keep the adhesive below the cross linking temperature when it is applied. The adhesive may be used to adjust the air flow resistance of the facing.

Furthermore, continuous or perforated films or nets or other nonwoven material comprising low density polyethylene, high density polyethylene, ethylene vinyl acetate, polypropylene, mealeic anhydride, or any olefinic materials manufacture using either the Ziegler Natta or a transition metal catalyst or any blends of these materials may be tacked to the surface of the air flow resistant scrim. These films, nets, and nonwoven materials are attached to the scrim with the knowledge that they will melt into adhesive islands during subsequent processes and will have minimal effect on the final air flow resistance of the acoustic composite.

In the course of investigating the properties of thin acoustic facings, wherein the acoustic tuning of the facing can be controlled, according to some embodiments of the present invention, Applicants have unexpectedly discovered that the mean pore size of the facing material directly relates to the permeability and air flow resistance, for example, as measured in Rayls. Experimental testing of mean pore size was performed on various acoustic facings, according to embodiments of the present invention, via a Capillary Flow Porometer CFP-1100-AEX manufactured by PMI, Inc. The pore size determination was made for each acoustic facing using the following methodology:

Standard Test Method for Pore Size (Porometer)

1. Scope
1.1 This test method is used to determine the pore size characteristics of non-woven and woven fabrics in a specific unit of measurement. This method ensures that finished goods meet specification or provides useful information regarding a sample.
2. Referenced Documents
2.1 ASTM E 1294-89, F 316
3. Summary of Test Method
3.1 A sample is wetted with a low surface tension and vapor pressure liquid and is placed in a chamber. An increasing air pressure is applied and as successively smaller pores empty, the airflow is recorded as a function of pressure. The maximum and minimum pore sizes are obtained and compared with the flow rate against applied pressure for a dry sample. The pore size distribution is thereby obtained in microns.
4. Apparatus
4.1 PMI Porometer (Note: see the Standard Operating Procedure for the Porometer for specifics on calibration and maintenance.)
4.2 Porewick test solution
4.3 watch glass, tweezers, clicker/Hytronic press, 37 mm diameter cutting die
5. Hazards/Safety
5.1 Ensure proper placement of hands when using the clicker press
5.2 Avoid chemical contact with eyes.
6. Conditioning
6.1 Samples do not require conditioning prior to testing.
7. Sampling
7.1 Refer to Standard Guidelines for Specimen Sampling. Generally, a side center side sampling plan is used.
8. Procedure
8.1 Cut 37 mm diameter samples for testing. Pour very small amount of Porewick solution into a watch glass. Place a sample to be tested into the solution.
8.2 Remove cover of test chamber, then remove the cylinder and top plate. Be sure to remove any samples that have already been tested. Be sure that the "O" ring is visible on the bottom plate.
8.3 Remove sample from solution with tweezers and place on the center of the bottom plate in the chamber.
Place the top plate ("O" ring side down) over the sample. Replace the cylinder ("O" ring and screen side down) over the top plate.
8.3 Double click on Capwin shortcut icon on computer. Click on group and select QC or other as needed. Click on Execute, then Auto-test.

8.4 Double click on output file name or choose a style folder, and enter required information.

8.5 Enter Operator, then Continue. Click on Start Test, continue, then OK to initiate test.

8.6 The computer will signal the end of the test with a message box. Click on OK and remove the sample from the chamber.

8.7 Back on the home page, click on Report, then Execute, then Begin. Follow further instructions to print summary sheet. After results are printed, click Continue, then Close to return to the home page.

9. Report 9.1 Report the average pore size in microns, or submit the Summary sheet.

Figure 5:
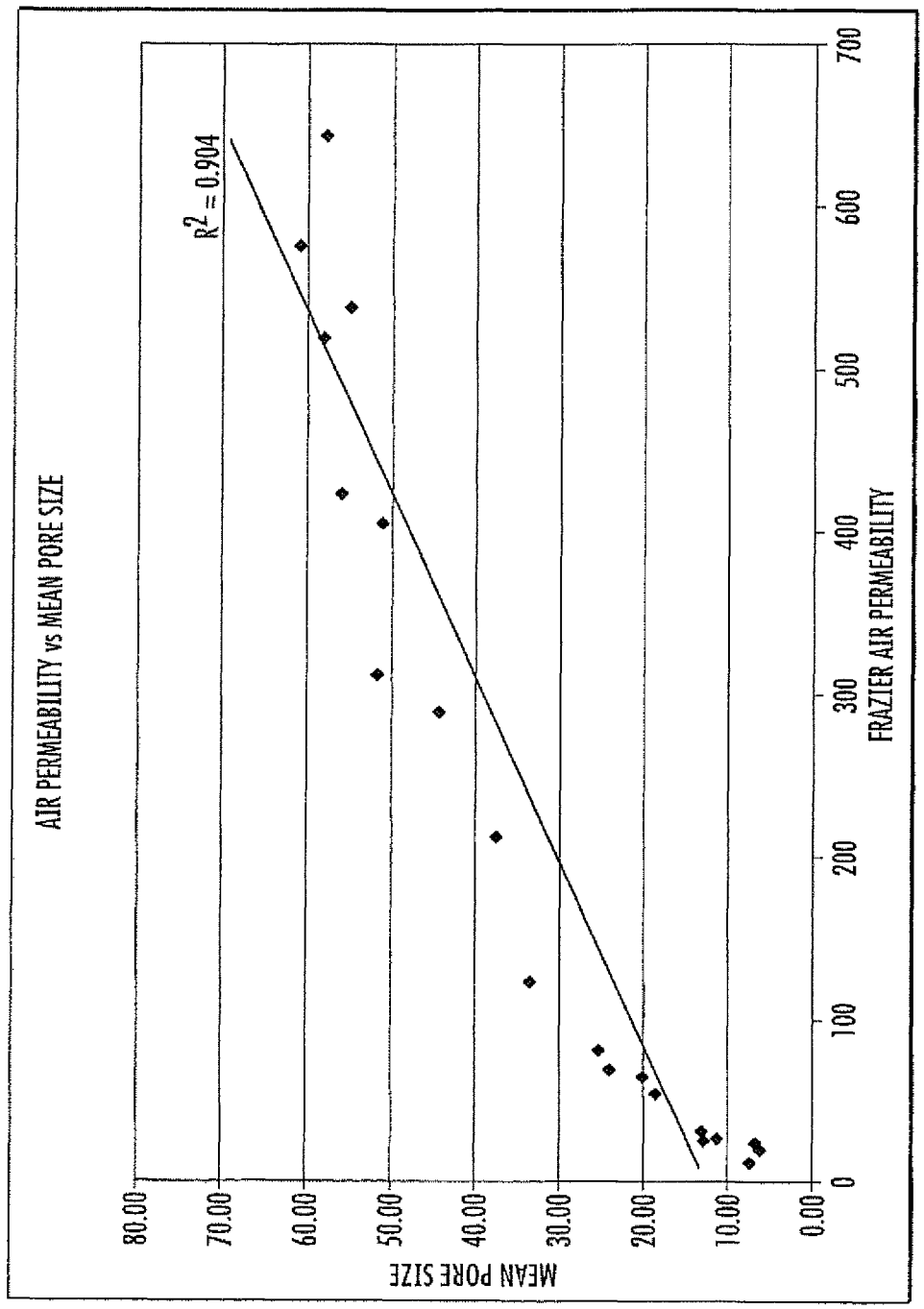
FIG. 5 is a graph of air permeability versus mean pore size for various facings, according to some embodiments of the present invention.
Figure 6:
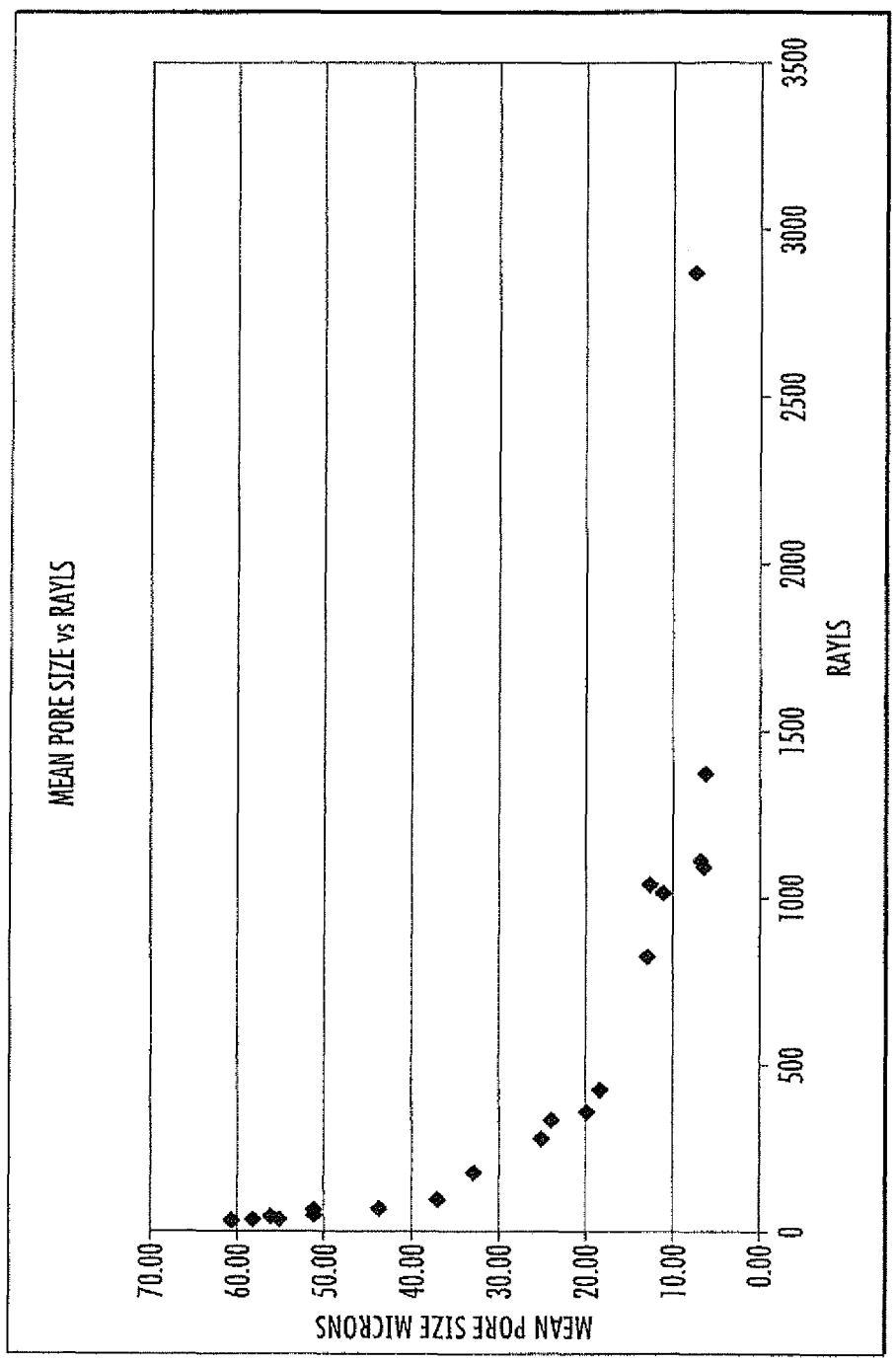
FIG. 6 is a graph of mean pore size versus Rayls for various facings, according to some embodiments of the present invention.

Data for various acoustic facings, according to embodiments of the present invention, is contained in the table illustrated in FIG. 4. The relationship between the mean pore size and air flow resistance, as measured in Rayls, for the various acoustic facings in the table of FIG. 4 is shown in the FIGS. 5 and 6.

Applicants have unexpectedly discovered acoustic materials that are acceptable for a moldable sound absorption panel facing, that are extensible enough be molded, that are thin, that are not heavy in basis weight, and have the proper pore size to deliver the permeability and acoustic resistance. A useful range of average pore size is from about 8 to about 40 microns.

Some of the materials listed in the above table, achieve the proper pore size through the use of microfiber. Synthetic microfibers are generally defined as fibers from about 0.1 to 10 microns in diameter. Microfiber can be produced by splitting larger fibers as in the Evolon® brand products from Freudenberg Nonwovens or by creating microfiber through meltblown processes as described in U.S. Pat. No. 5,178,932 to Perkins, or by flash spinning fiber as in the Tyvek® brand products from DuPont, or by producing multi component fiber, and dissolving away some of the fiber mass to leave microfibers. The use of microfiber based acoustic facing is well known.

However, for products that do not contain microfiber, or contain ineffective amounts of microfiber, Applicants have determined that the pore size and the acoustic properties are lacking in performance. Acoustic facings, according to embodiments of the present invention have a pore size of from about 8 to 40 microns, without the use of microfiber. Applicants have also found that one way of developing these acoustic facings is to prepare a nonwoven fabric that contains an effective amount of cellulose fibers. Cellulose fibers are flat and can produce effective pore size structures at useful basis weights. However, embodiments of the present invention are not limited to the use of cellulosic fibers.

The following examples are merely illustrative of the invention, and are not limiting thereon.

Example 1

We loaded a 155" wide roll of wood pulp/polyester spunlaced fabric (i.e., facing), known by the brand name Sontara Style 8851 onto a creel stand in front of a finishing frame. This Sontara fabric has an average air flow resistance of 496 Rayls. We padded the 2.1 ounce per square yard fabric, through a dip and nip style pad bath at 70 pounds per square inch to achieve a wet pick up of around 130 percent of the following formulation:

Mix Formula: To 50 gallons of water we added 20 lbs of Suncryl CP-75 (Omnova), a vinyl acrylic copolymer dispersion), while stirring. We continued stirring and added 10 lbs of S-Inmont Black 6612 (BASF Corporation), a carbon black pigment dispersion, and then 210 lbs of Spartan 590FR (Spartan Flame Retardants, Inc), an ammonium phosphate type flame retardant. We increased the volume to 100 gallons of water while stirring to complete the mix.

After the pad process the fabric is pinned onto a pin tenter frame, stretched to width and dried as follows:

1. unstretched i.e. 0 percent resulting in an air flow resistance of 700 Rayls, a basis weight of 2.7 osy, and a SE rating for MVSS 302 flammability.
2. stretched to 159 inches 2.58 percent resulting in an air flow resistance of 578 Rayls, a basis weight of 2.6 osy, and a SE rating for MVSS 302 flammability.
3. stretched to 168 inches 8.38 percent resulting in an air flow resistance of 458 Rayls, a basis weight of 2.6 osy, and a SE rating for MVSS 302 flammability.

In another experiment we used the Sontara Style 8851 fabric (i.e., facing) mentioned above and padded the following mix onto the fabric at 70 psi to achieve a wet pick up of around 130 percent of the following mix:

Mix Formula: To 50 gallons of 30° C. water we added 12 lbs of Lumacron Black SEF 300 percent (Dohmen), a disperse dye, while stirring. We continued stirring and added 240 lbs of Spartan 987FR (Spartan Flame Retardants, Inc), a non-durable, nonfogging ionic flame retardant. Then we increased the volume to 100 gallons of water while stirring to complete the mix.

After the pad process the fabric was pinned onto a pin tenter and stretched to the 174" 12.2 percent and dried resulting in an air flow resistance of 386 Rayls, a SE rating for MVSS 302 flammability, and a basis weight of 2.4 osy.

Example 2

We loaded a 154" wide roll of blue wood pulp/polyester spunlaced fabric (i.e., facing), known by the brand name Sontara Style 9918 onto a creel stand in front of a finishing frame. This Sontara fabric has an average air flow resistance of 449 Rayls. We padded the 2.5 osy fabric, through a dip and nip style pad bath at 90 psi to achieve a wet pick up of around 139 percent using undiluted Spartan 987FR (Spartan Flame Retardants, Inc).

After the pad process the fabric was pinned onto a pin tenter and stretched from 155" to 166". The stretched fabric had an air flow resistance of 740 Rayls, a SE rating for MVSS 302 flammability, and a basis weight of 4.3 osy.

In a similar example we used Sontara 8851 and undiluted Spartan 987FR padded at 90 psi and necked the fabric from 155" down to 146". This resulted in a fabric with an average air flow resistance of 839 Rayls, a SE rating for MVSS 302 flammability, and a basis weight of 3.5 osy.

Example 3

We followed the methodology of the above experiment with a few changes. The 100 gallon pad bath mix was made to incorporate the following ingredients: 25 pounds of Amgard CT (Rhodia Corporation) a durable cyclic phosphonate, 33.5 pounds of Spartan 880FR (Spartan Flame Retardants, Inc), 70 pounds of Inmont S Black 6612 (BASF Corporation), and 125 pounds of Phobol 8315 (Ciba Corporation) a fluorocarbon based water repellent.

In this example we used Sontara 8851 and a pad pressure of 90 psi and necked the fabric down from 155" to 143". This resulted in a fabric with an average air flow resistance of 839 Rayls, a SE rating for MVSS 302 flammability, and a basis weight of 2.7 osy.

Example 4

We calendared fabrics (i.e., facings) from the examples above using a hot oil calendar having a composite roll over a steel roll running at 40 ypm, 2000 psi and 200° F.
1. The average air flow resistance of the 700 Rayl fabric, increased to 2048 Rayls (Dev. Facing A);
2. The average air flow resistance of the 578 Rayl fabric, increased to 1687 Rayls (Dev. Facing B);
3. The average air flow resistance of the 458 Rayl fabric, increased to 1629 Rayls (Dev. Facing C);
4. The average air flow resistance of the 386 Rayl fabric (processed at 1600 psi rather than 2000 psi), increased to 1143 Rayls (Dev. Facing D).

The normal incidence sound absorption is shown in FIG. 1.

Examples 5-7

We loaded a 155" wide roll of wood pulp/polyester spunlaced fabric (i.e., facing) (Sontara Style 8851) onto a creel stand in front of a finishing frame. This Sontara fabric has an average air flow resistance of 496 Rayls. We padded the 2.1 ounce per square yard fabric, through a dip and nip style pad bath at 70 pounds per square inch to achieve a wet pick up of around 130 percent of a formulation:
Mix Formula: To 50 gallons of water we added 70 lbs of Inmont S Black 6612 (BASF Corporation, a carbon black dispersion) while stirring. We continued stirring and added 70 lbs of acrylic latex dispersion (Rhoplex TR-25 (Dow Chemical Corporation). The volume of water was increased to 100 gallons of water while stirring to complete the mix. After the pad process the fabric was pinned onto a pin tenter and necked down in the machine direction from 155" to 143". The necked down fabric had an air flow resistance of 728 Rayls and a basis weight of 2.5 osy. This cellulosic fabric was combined with a nonwoven batt based on fiberglass fibers as follows:

| Example | Density of Nonwoven Fiber Batt (lbs/ft$^3$) |
|---|---|
| 5 | 2.0 |
| 6 | 1.5 |
| 7 | 1.25 |

Example 8

An all fiber nonwoven, with viscose (cellulose) fiber blended with polyester fiber, was prepared. A 63" wide roll of a 78 gsm 70/30 Viscose/Polyester spunlaced fabric from Alhstrom Greenbay was loaded onto a creel stand in front of a finishing frame. This fabric has an average air flow resistance of 90 Rayls. We pad finished the 78 gsm fabric in a similar process described in the above examples with a black, fire retardant, water repellent, and corrosion resistant finish.

After the pad process the fabric is pinned onto a pin tenter frame, where the fabric can be stretched or necked down. In this example the product was unstreteched (63" in, 63" out), which resulted in a basis weight of 85 gsm, an air flow resistance of 93 Rayls, and a SE rating for MVSS 302 flammability. The product was further calendered at a temperature of 250 F and pressure of 2000 psi, which resulted in a reduction of air flow resistance to 278 Rayls.

Comparative Example 1

A nonwoven fiberglass batt having a density of 2.0 lbs/ft$^3$ was combined with a 1.7 ounce/square yard, 100% polyester thermal bonded nonwoven fabric, with a coating of low density polyethylene adhesive, from Textil Gruppe H of, with a permeability of 50-100 rayls (average 60 rayls).

Figure 2:
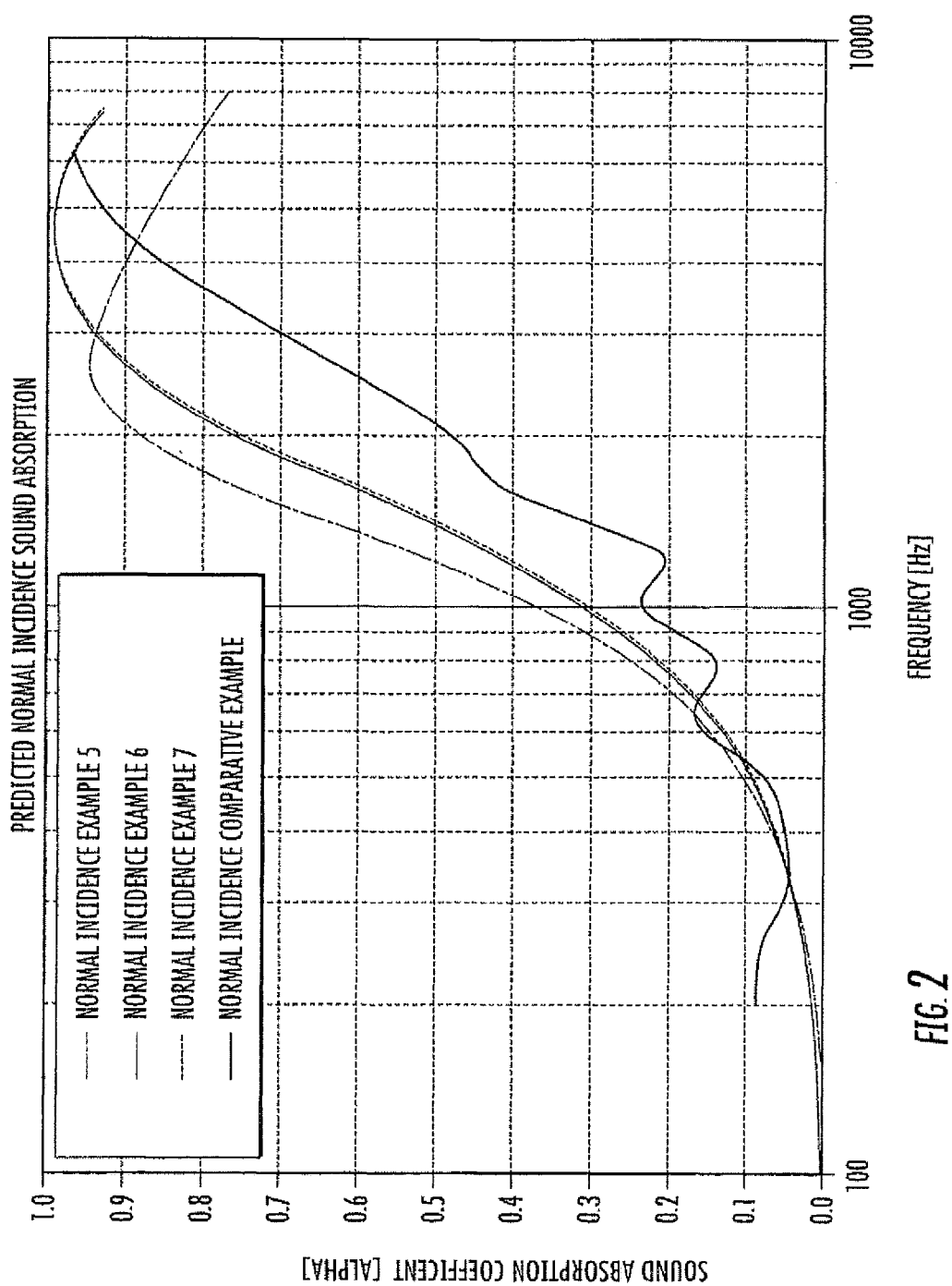
FIG. 2 is a predicted normal incidence sound absorption graph using ESI Nova modeling software.
Figure 3:
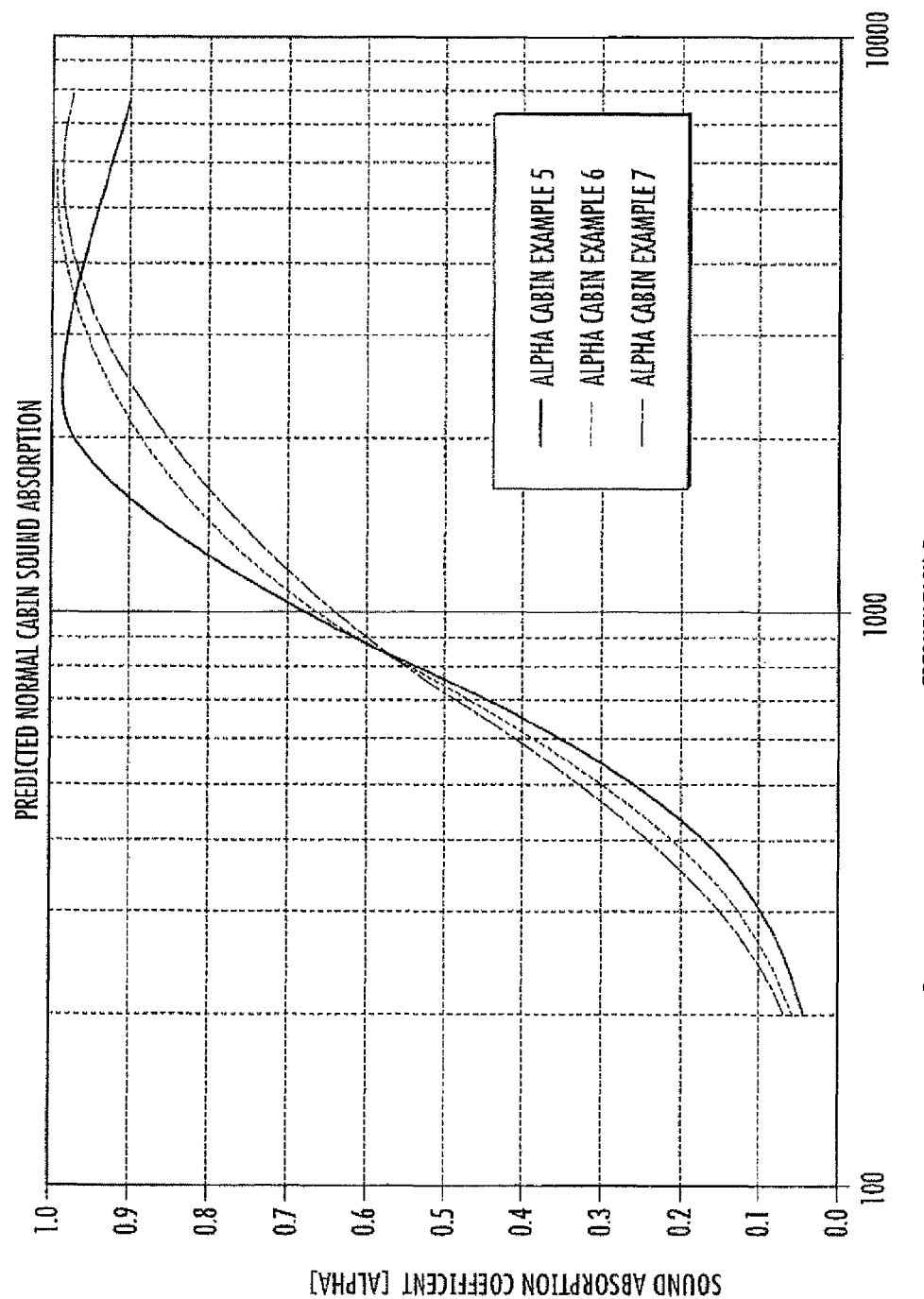
FIG. 3 is a predicted alpha cabin sound absorption graph using ESI modeling software.

FIG. 2 illustrates the predicted normal incidence sound absorption of Examples 5-7 and the Comparative Example 1. FIG. 3 measures the predicted alpha cabin sound absorption of Examples 5-7. This demonstrates that a facing, according to embodiments of the present invention, can provide acceptable sound absorption properties without requiring higher density and more expensive materials as the nonwoven batt.

All Fiber Example 1

A 63" wide roll of a 78 gsm 70/30 Viscose/Polyester spunlaced fabric was loaded onto a creel stand in front of a finishing frame. This fabric has an average air flow resistance of 90 Rayls. We pad finished the 78 gsm fabric in a similar process described in the above examples with a black, fire retardant, water repellent, and corrosion resistant finish.

After the pad process the fabric is pinned onto a pin tenter frame, where the fabric can be stretched or necked down. In this example the product was unstretched (63" in, 63" out), which resulted in a basis weight of 85 gsm, an air flow resistance of 93 Rayls, and a SE rating for MVSS 302 flammability. The product was further calendered at a temperature of 250 F and pressure of 2000 psi, which resulted in a reduction of air flow resistance to 278 Rayls.

All Fiber Example 2

A 58" wide roll of a 78 gsm 70/30 Viscose/Polyester spunlaced fabric was loaded onto a creel stand in front of a finishing frame. This fabric has an average air flow resistance of 90 Rayls. We pad finished the 78 gsm fabric in a similar process described in the above examples with a black, fire retardant, and water repellent.

After the pad process the fabric is pinned onto a pin tenter frame where the fabric width can be adjusted. The above finished fabric was processed at two different widths described below.
Stretched slightly (58" to 61"), which resulted in a finished basis weight of 98 gsm, an air flow resistance of 126 Rayls, and a SE rating for MVSS 302 flammability after finishing.
Necked down (58" to 46"), which resulted in a finished basis weight of 124 gsm, an air flow resistance of 218 Rayls, and a SE rating for MVSS 302 flammability after finishing.

The above material was further processed using a calendaring process at 2000 psi with the varied temperatures.
The slightly stretched material was calendared at 200° F., which resulted in an air resistance of 310 Rayls.
The necked down material was calendared at various temperatures summarized below.
100° F., which resulted in an air resistance of 436 Rayls
150° F., which resulted in an air resistance of 607 Rayls
200° F., which resulted in an air resistance of 908 Rayls

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:
1. A sound absorption facing that comprises less than about five percent (5%) synthetic microfiber and has a basis weight of from about 1.5 to about 5.0 ounces per square yard (osy), a thickness of less than about 0.050" as measured via ASTM D1777, a mean pore size of between about 8 microns and about 40 microns and an acoustic resistance of at least about 250 Rayls.

2. The sound absorption facing of claim 1, wherein the facing comprises cellulosic fibers.

3. The sound absorption facing of claim 2, wherein the cellulosic fibers comprise one or more fibers selected from the group consisting of wood, cotton, rayon and lyocell.

4. The sound absorption facing of claim 2, wherein the cellulosic fibers comprise between about 20 to about 100 percent by weight of the sound absorption facing.

5. The sound absorption facing of claim 1, wherein the facing comprises synthetic fibers.

6. The sound absorption facing of claim 5, wherein the synthetic fibers comprise one or more fibers selected from the group consisting of polypropylene, polyethylene, polyethylene terephthalate, polyester, acetate, nylon, polylactic acid, glass and acrylic fibers.

7. The sound absorption facing of claim 5, wherein synthetic fibers comprise between about 0 to about 80 percent by weight of the sound absorption facing.

8. The sound absorption facing of claim 1, wherein the facing comprises a nonwoven fabric.

9. The sound absorption facing of claim 8, wherein the nonwoven fabric is a spunlaced fabric.

10. The sound absorption facing of claim 8, wherein the nonwoven fabric is a spunlaced fabric comprising cellulosic fibers.

11. The sound absorption facing of claim 8, wherein the nonwoven fabric is a spunlaced fabric comprising cellulosic fibers and synthetic fibers.

12. The sound absorption facing of claim 1, wherein the facing comprises cellulosic fibers in the form of a web or paper sheet.

13. The sound absorption facing of claim 1, wherein the facing comprises cellulosic fibers entangled with synthetic fibers.

14. The sound absorption facing of claim 1, wherein the air flow resistance of the sound absorption facing has been modified by one or more mechanical processes.

15. The sound absorption facing of claim 14, wherein mechanical processes include stretching, bulking, calendaring or any combination thereof.

16. The sound absorption facing of claim 1, wherein the air flow resistance of the sound absorption facing has been modified by one or more chemical treatment processes.

17. The sound absorption facing of claim 16, wherein chemical treatment processes include finishing, coating, adhesive application, or any combination thereof.

18. The sound absorption facing of claim 1, wherein the facing possesses one or more functional properties selected from the group consisting of flame retardancy, adhesive properties, crock resistance, microbial resistance, water repellency, oil repellency and corrosion resistance.

19. The sound absorption facing of claim 1, wherein the facing passes the flammability test required by MVSS-302.

20. The sound absorption facing of claim 1, wherein the facing achieves an SE rating when tested in accordance with MVSS-302.

21. The sound absorption facing of claim 1, wherein the facing has an elongation at break point of at least 17 percent (17%) as measured via ASTM D5034.

22. The sound absorption facing of claim 1, wherein the facing has an elongation at break point of at least 20 percent (20%) as measured via ASTM D5034.

23. The sound absorption facing of claim 1, wherein the facing has an elongation at break point of about 22 to about 36 percent (22-36%) as measured via ASTM D5034.

24. The sound absorption facing of claim 1, wherein the facing comprises spunlaced cellulosic fibers, wherein the air flow resistance of the sound absorption facing has been modified by one or more processes selected from the group consisting of mechanical processes and chemical treatment processes and wherein the facing possesses one or more functional properties selected from the group consisting of flame retardancy, microbial resistance, water repellency, oil repellancy and corrosion resistance.

25. The sound absorption facing of claim 24, wherein the cellulosic fibers comprise one or more fibers selected from the group consisting of wood, cotton, rayon and lyocell, wherein mechanical processes include stretching, bulking, calendaring or any combination thereof, wherein chemical treatment processes include finishing, coating, adhesive application, or any combination thereof, wherein the facing passes the flammability test required by MVSS-302 and wherein the facing has an elongation at break point of at least 17 percent (17%) as measured via ASTM D5034.

26. The sound absorption facing of claim 24, wherein the cellulosic fibers comprise one or more fibers selected from the group consisting of wood, cotton, rayon and lyocell, wherein mechanical processes include stretching, bulking, calendaring or any combination thereof, wherein chemical treatment processes include finishing, coating, adhesive application, or any combination thereof, wherein the facing passes the flammability test required by MVSS-302 and wherein the facing has an elongation at break point of at least 20 percent (20%) as measured via ASTM D5034.

27. A laminate, comprising:
   a sound absorption facing that comprises less than about five percent (5%) synthetic microfiber and has a basis weight of from about 1.5 to about 5.0 ounces per square yard (osy), a thickness of less than about 0.050" as measured via ASTM D1777, a mean pore size of between about 8 microns and about 40 microns and an acoustic resistance of at least about 250 Rayls; and
   at least one additional layer laminated to the sound absorption facing.

28. The laminate of claim 27, wherein the at least one additional layer is selected from the group consisting of fiberglass batting, a resinated fiberglass panel, rock wool, plastic foam, urethane foam, shoddy pad from waste fiber, polyester batting or resinated fiberfill, aerogel, closed cell foam and reticulated foam.

29. The laminate of claim 27, wherein the at least one additional layer is a decorative fabric layer.

30. The laminate of claim 27, wherein the at least one additional layer comprises an adhesive.

31. The laminate of claim 27, wherein the at least one additional layer comprises an adhesive web, an adhesive film or a combination thereof.

32. The laminate of claim 30, wherein the adhesive comprises a thermoplastic adhesive.

33. The laminate of claim 27, wherein the facing comprises cellulosic fibers.

34. The laminate of claim 33, wherein the cellulosic fibers comprise one or more fibers selected from the group consisting of wood, cotton, rayon and lyocell.

35. The laminate of claim 27, wherein the facing comprises synthetic fibers.

36. The laminate of claim 35, wherein the synthetic fibers comprise one or more fibers selected from the group consisting of polypropylene, polyethylene, polyethylene terephthalate, polyester, acetate, nylon, polylactic acid, glass and acrylic fibers.

37. The laminate of claim 27, wherein the facing comprises a nonwoven fabric.

38. The laminate of claim 37, wherein the nonwoven fabric is a spunlaced fabric.

39. The laminate of claim 27, wherein the facing has an elongation at break point of at least 17 percent (17%) as measured via ASTM D5034.

40. The laminate of claim 27, wherein the facing has an elongation at break point of at least 20 percent (20%) as measured via ASTM D5034.

41. A laminate, comprising:
first and second sound absorption facings, wherein each facing comprises less than about five percent (5%) synthetic microfiber and has a basis weight of from about 1.5 to about 5.0 ounces per square yard (osy), a thickness of less than about 0.050" as measured via ASTM D1777, a mean pore size of between about 8 microns and about 40 microns and an acoustic resistance of at least about 250 Rayls; and
a low density layer of material sandwiched between the first and second sound absorption facings, wherein the low density layer of material is selected from the group consisting of fiberglass batting, a resinated fiberglass panel, rock wool, plastic foam, urethane foam, shoddy pad from waste fiber, polyester batting or resinated fiberfill, aerogel, closed cell foam and reticulated foam.

42. The laminate of claim 41, wherein each facing has an elongation at break point of at least 17 percent (17%) as measured via ASTM D5034.

43. The laminate of claim 41, wherein each facing has an elongation at break point of at least 20 percent (20%) as measured via ASTM D5034.

44. An article, comprising:
a sound absorption facing that comprises less than about five percent (5%) synthetic microfiber and has a basis weight of from about 1.5 to about 5.0 ounces per square yard (osy), a thickness of less than about 0.050" as measured via ASTM D1777, a mean pore size of between about 8 microns and about 40 microns, an elongation at break of at least seventeen percent (17%) as measured via ASTM D5034 and an acoustic resistance of at least about 250 Rayls;
a finish or coating, wherein the finish or coating imparts one or more additional functional properties to the facing; and
a low density layer of material laminated to the facing.

45. The article of claim 44, wherein the facing has an elongation at break point of at least 17 percent (17%) as measured via ASTM D5034.

46. The laminate of claim 44, wherein the facing has an elongation at break point of at least 20 percent (20%) as measured via ASTM D5034.

47. The sound absorption article of claim 44, wherein the one or more additional functional properties is selected from the group consisting of flame retardancy, adhesive properties, crock resistance, grab tensile, tear strength, color, microbial resistance, electrical conductivity, thermal conductivity, opacity, controllable modulus, water repellency, corrosion resistance, and controllable surface texture.

48. A method of making a sound absorption facing, comprising:
preparing a fabric that comprises less than about five percent (5%) synthetic microfiber and has a basis weight of from about 1.5 to about 5.0 ounces per square yard (osy), a thickness of less than about 0.050" as measured via ASTM D1777 and a mean pore size of between about 8 microns; and
tuning the fabric to have an acoustic resistance of at least about 250 Rayls, wherein tuning the sound absorption fabric comprises:
applying one or more chemical finishes or coatings to the fabric;
subjecting the fabric to one or more mechanical processes selected from the group consisting of stretching, bulking, or calendaring, or a combination thereof; or
a combination thereof.

49. The method of claim 48, further comprising laminating at least one additional layer to the fabric.

50. The method of claim 49, wherein the at least one additional layer is selected from the group consisting of fiberglass batting, a resinated fiberglass panel, rock wool, plastic foam, urethane foam, shoddy pad from waste fiber, polyester batting or resinated fiberfill, aerogel, closed cell foam and reticulated foam.

51. The method of claim 49, wherein the at least one additional layer is a decorative fabric layer.

52. The method of claim 49, wherein the at least one additional layer comprises an adhesive.

53. The method of claim 49, wherein the at least one additional layer comprises an adhesive web, an adhesive film or a combination thereof.

54. The method claim 48, wherein the fabric has has an elongation at break point of at least 17 percent (17%) as measured via ASTM D5034.

55. The method claim 48, wherein the fabric has has an elongation at break point of at least 20 percent (20%) as measured via ASTM D5034.

* * * * *